(12) United States Patent
Janzen et al.

(10) Patent No.: US 6,453,844 B1
(45) Date of Patent: Sep. 24, 2002

(54) ANIMAL WASTE DISPOSAL SYSTEM

(76) Inventors: Walter James Janzen, #15 52304 Range Road 233, Sherwood Park, Alberta (CA), T8B 1C9; Robert Gerald Connell, #2 53371 Range Road 231, Sherwood Park, Alberta (CA), T8A 4V2

( * ) Notice: Subject to any disclaimer, the term of this patent is extended or adjusted under 35 U.S.C. 154(b) by 92 days.

(21) Appl. No.: 09/661,903

(22) Filed: Sep. 14, 2000

(51) Int. Cl.[7] .............................................. A01K 1/035
(52) U.S. Cl. ...................................... 119/163; 119/161
(58) Field of Search ................................ 119/161, 162, 119/163, 166, 421

(56) References Cited

U.S. PATENT DOCUMENTS

| | | | |
|---|---|---|---|
| 2,883,963 A | * 4/1959 | Scott | 119/161 |
| 3,734,057 A | 5/1973 | Lee et al. | |
| 3,793,987 A | * 2/1974 | Rogers | 119/161 |
| 3,835,812 A | 9/1974 | Edwards | |
| 3,848,568 A | 11/1974 | Hazen | 119/527 |
| 3,921,582 A | 11/1975 | Sedlmeir | |
| 3,964,437 A | 6/1976 | Brown | |
| 5,048,463 A | * 9/1991 | Wilson et al. | 119/163 |
| 5,113,801 A | * 5/1992 | Rotstein et al. | 119/163 |
| 5,117,780 A | 6/1992 | Wooten et al. | 119/162 |
| 5,279,258 A | 1/1994 | Kakuta | 119/164 |
| 5,363,807 A | 11/1994 | Kakuta | 604/164 |
| 5,458,090 A | 10/1995 | Favreau | 119/163 |
| 5,592,900 A | 1/1997 | Kakuta | 119/164 |

FOREIGN PATENT DOCUMENTS

| CA | 1086455 | 9/1980 | 4/17 |
|---|---|---|---|

* cited by examiner

Primary Examiner—Robert P. Swiatek
(74) Attorney, Agent, or Firm—Jones, Tullar & Cooper, P.C.

(57) ABSTRACT

A disposal system for animal waste includes a housing having upstanding walls defining an entranceway and a floor which slopes downwardly and rearwardly from a forward edge at the entranceway to a rear edge. A collection groove or trough extends transversely of the floor at the rear edge and is provided with a bottom surface which slopes downwardly to a disposal pipe. The pipe in turn is connected to an electrical pump which is adapted to move waste from the collection groove to a sewer. Preferably the pump is provided with macerator blades which will macerate or comminute the solid waste to improve its flowability to the sewer. The floor is provided with a plurality of generally parallel grooves in the upper surface thereof, which grooves collect liquid waste and allow it to flow downwardly to the collection groove without much liquid remaining on the upper surface of the floor. With this invention the animal will not be stepping in its own liquid waste after urination and there will be little or no liquid waste tracked by the animal after it leaves the housing. The pump and a separate flushing system, which can operate automatically after the animal has relieved itself, ensure a quick removal of liquid and solid waste from the housing, leaving the housing fairly clean and odor-free.

14 Claims, 3 Drawing Sheets

ANIMAL WASTE DISPOSAL SYSTEM

The present invention relates to a disposal system for animal waste, and in particular to a disposal system adapted for use with pets primarily within the home, typically dogs and cats.

BACKGROUND OF THE INVENTION

There have been many attempts over the years to develop a disposal system for animal waste that will simplify the process of manually collecting and disposing of pet animal wastes. Most pet owners will spend considerable time and effort training their pets to follow a routine or schedule for urination and defecation. Cats, for example, are trained to use a litter box and dogs are usually trained to wait until they are outdoors before they eliminate their waste. In each instance the pet owner is left with the task of collecting and disposing of the litter and its contents or of collecting and disposing of feces that have been deposited on the ground outside. Of course, during the initial training period, and occasionally thereafter, the pet owner is faced with cleaning up accidents in the living quarters, an unpleasant task at the best of times.

There have been a number of attempts at developing a pet toilet or commode in which the pet dog or cat will perform its elimination duties and which will be connected to a standard toilet so that the waste can be flushed into the municipal sewer system, thereby avoiding human participation. Some such devices have included automatic flushing mechanisms that are responsive to the presence and subsequent departure of the animal therefrom. However, such pet toilets have not been particularly successful, because they do not address the problem of the animal stepping in its own liquid or solid waste and then tracking such waste into the house as it leaves the toilet.

U.S. Pat. No. 3964437 to Brown discloses a dog or animal toilet that was designed for indoor or outdoor use and can be connected to a sewer. The toilet, however, lacks a flushing unit for flushing waste into the sewer. It has a flat floor and consequently the animal would likely step in its own liquid waste and would track such into the house when it leaves the toilet.

Canadian Patent No. 1086455 of Sep. 30, 1980 teaches a pet commode having upstanding walls and a lower floor bottom to which a drain is connected. There is a pivoting floor above the lower floor bottom which collects feces and urine and then detects when the animal has left the device. There is a spray tube which sprays upwardly towards the pivoting floor as it pivots and thus cleans urine and feces therefrom as such waste falls through the gaps between the pivoting floor slats. Should the animal decide to revisit the unit while the floor slats are pivoting it could injure itself if its legs become trapped between the slats. This same problem could arise if the household has more than one animal and the second animal enters the unit before the cleansing operation is complete. Furthermore, the cleansing action on the lower floor is not particularly efficient and waste could accumulate without being directed to the sewer. The system is quite complex, requiring many moving parts and would be prone to breakdown, making it expensive to repair.

U.S. Pat. No. 3734057 of May 22, 1973 to Lee and Tucker teaches a pet toilet that has an enclosure defining an entrance area and upstanding walls. A portion of the upper surface of the floor is inclined downwardly towards a drain and a flushing system is provided for flushing the unit after the animal has deposited its waste on the floor. Even though the floor is inclined somewhat to facilitate runoff of liquid waste and flushing water there is nothing to prevent the animal from stepping into the liquid waste before or while it flows towards the drain.

SUMMARY OF THE INVENTION

The present invention is intended to overcome the problems associated with the prior art, including the patents identified hereinabove. The present invention provides an animal waste system that includes a housing defining upstanding walls and a floor therewithin, the floor sloping downwardly from a forward entrance edge thereof towards a rear edge. The floor is provided with a plurality of generally parallel grooves in the upper surface thereof, primarily to collect liquid waste and to thereby minimize the amount of liquid waste that will accumulate on the floor upper surface itself. This in turn will minimize the possibility of the animal stepping in its own liquid waste before exiting the housing. A collection groove or trough extends transversely of the floor grooves at the rear edge of the floor and the floor grooves exit into the collection trough. The lower surface of the trough slopes downwardly to a drain opening which in turn has a drain pipe connected thereto. The drain pipe leads to a pump which is adapted to pump waste from the collection trough through the drain pipe to a disposal pipe that is connected to a sewer. For greater efficiency the pump may be provided with macerator blades or gears for macerating solid waste as it passes therethrough, making it easier for such waste to pass to the sewer.

The disposal system of the present invention improves on the prior art by providing a positive disposal mechanism in the form of the pump and by providing the floor grooves which reduce considerably the possibility of the animal tracking liquid waste out of the housing and into its master's living area.

DESCRIPTION OF THE PREFERRED EMBODIMENT

Figure 1:
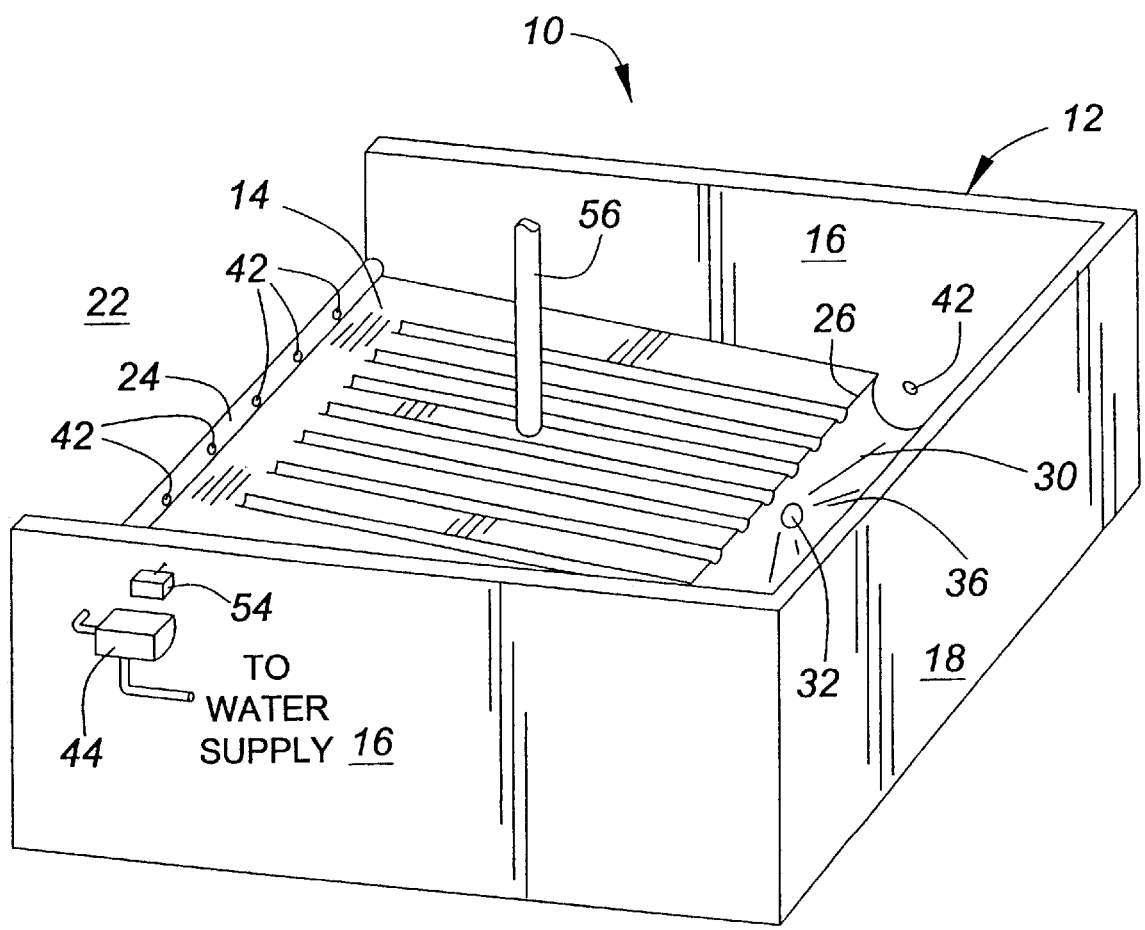
FIG. 1 is a perspective view of the disposal system of the present invention.
Figure 2:
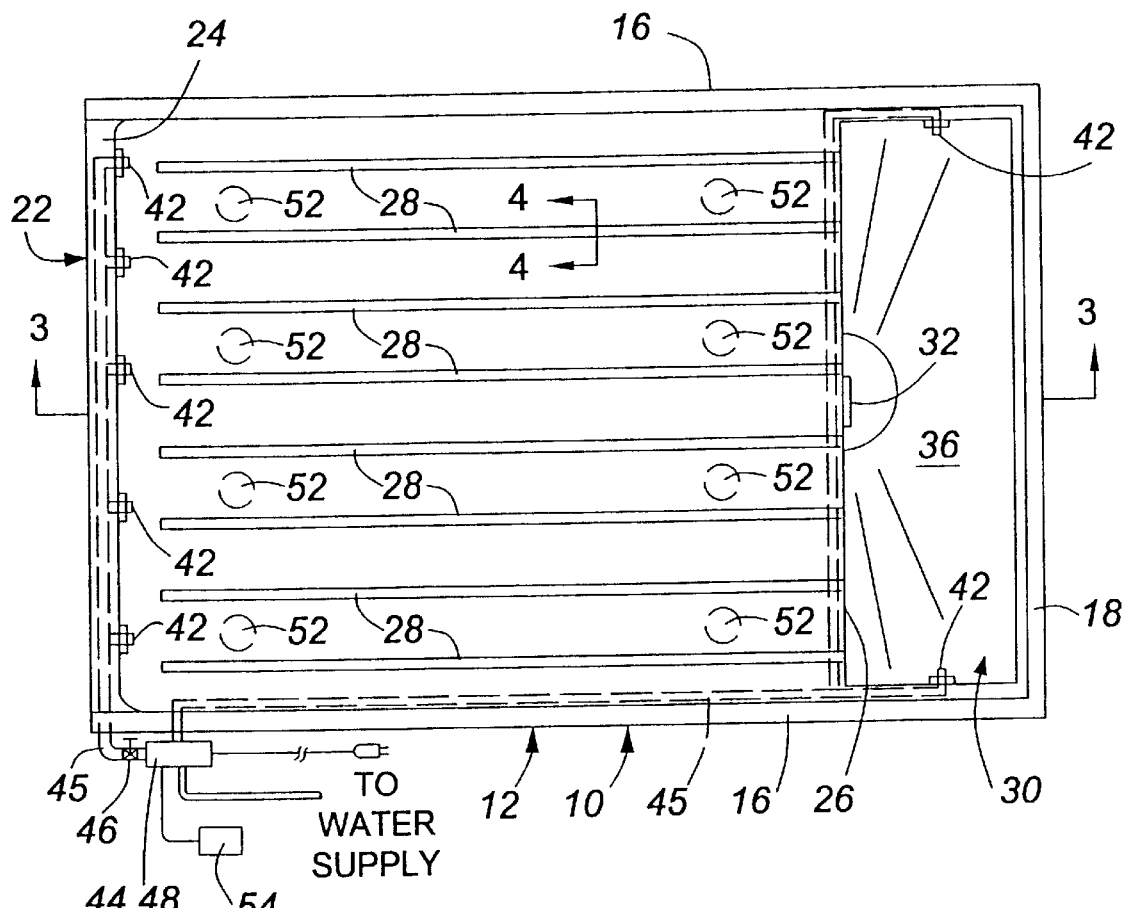
FIG. 2 is a top plan view showing the general layout of the disposal system of the present invention.

FIG. 1 illustrates generally the overall configuration of the disposal system 10 of the present invention. It will be noted that the system includes a housing 12 defined on three sides by upstanding side walls 16, 16 and a rear wall 18. The walls extend down to bottom edges 20 which support the system on a building floor or any other support surface. A floor 14 is contained within the housing and is surrounded by the walls 16, 16, 18. The walls 16, 16 define an entranceway 22 adjacent the raised forward edge 24 of the floor 14, suitably sized for an animal, such as a dog or a cat, to step into the interior of the housing.

Figure 3:
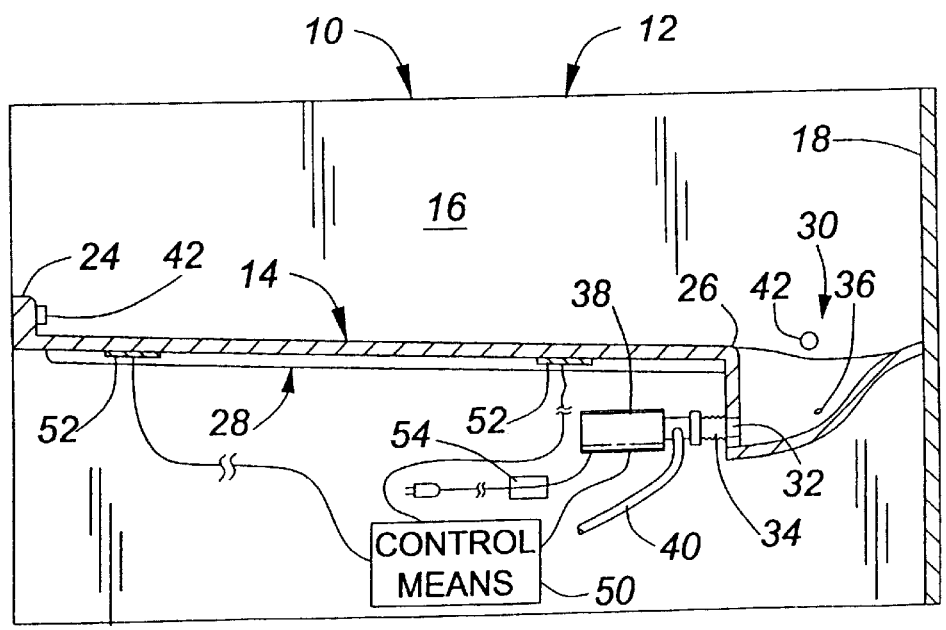
FIG. 3 is a cross-sectional view taken on the line 3—3 of FIG. 2.
Figure 5:
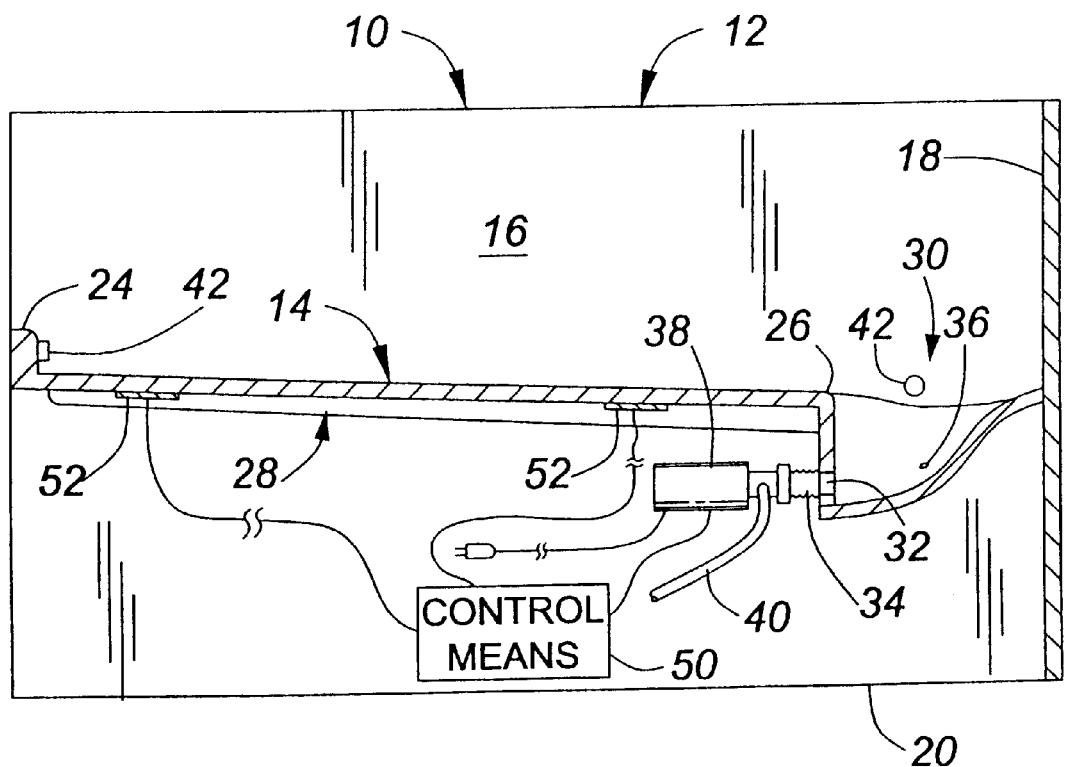
FIG. 5 is a longitudinal cross-sectional view showing an alternative configuration for the floor grooves.

With reference to FIGS. 1, 3 and 5 it will be noted that the floor 14 slopes slightly downwardly and rearwardly from its forward edge 24 towards its rear edge 26. The slope angle is sufficient to allow liquid waste to flow smoothly towards the rear edge without causing the animal to feel insecure on a sloping surface. A slope of 2° to 80° is sufficient to meet these requirements.

Figure 4:
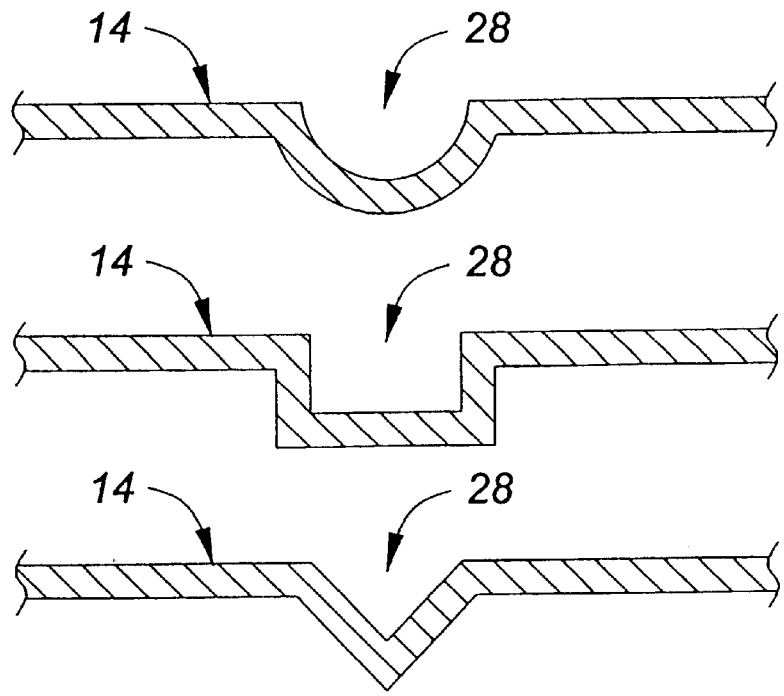
FIG. 4 shows a series of enlarged cross-sectional views taken on the line 4—4 of FIG. 2

Floor 14 is also provided with a plurality of grooves 28 which are generally parallel to each other and which extend from adjacent the forward edge 24 of the floor towards the rear edge 26. Each groove may have a generally semicircular cross-section or it may be rectangular or V-shaped as desired (FIG. 4). The grooves may have a constant depth along the length thereof. However, as seen in FIG. 5 the grooves 28 preferably slope downwardly at an angle slightly greater, by 5° or so, than the downward slope of the floor itself. The greater slope of these grooves will improve the flow of liquid therealong without increasing the chance of the pet losing its balance and slipping on the floor surface.

Between the floor rear edge 26 and the rear wall 18 there is a transversely extending collection groove or trough 30 into which the floor grooves 28 exit. The collection trough extends essentially the full width of the housing between the side walls 16,16. The depth of the collection trough 30 is considerably greater than the depth of the floor grooves 28 and in the preferred embodiment there is a drain opening 32 at the center of the collection trough, which opening permits waste to flow therethrough into a disposal pipe 34. It is also preferred that the bottom wall 36 of the collection trough slope downwardly from adjacent each wall 16 towards the drain opening 32 to facilitate the flow of waste to the drain opening. Although the drain opening is shown in a rear wall of the trough it could also be located closer to the lowest section of the trough floor. Furthermore, the drain opening could be located adjacent one end of the trough rather than in the center as shown in the drawings.

Drain pipe 34 is connected to an electric pump 38 that is designed to pump waste along the drain pipe to another pipe 40 that is connected to a sanitary sewer (not shown). The pump is electrically connected to control means 50 that will automatically activate the pump at the desired point of time as will be described hereinbelow. In its preferred form the pump 38 includes macerator means (not shown) such as cutting blades or gears which will macerate or comminute solid wastes to facilitate the flow thereof through the pump and along the pipes 34, 40 to the sewer.

Mounted in the front edge 24 and in the side walls 16, 16 above the trough 30 are nozzle outlets 42 which are connected to a flushing unit 44. The flushing unit is used to spray water into the housing after an animal has eliminated waste into the disposal system of this invention. The nozzles should be directed downwardly at an angle so that water is sprayed onto the floor 14 and into the trough. Flushing unit 44 is connected to appropriate conduits or pipes 45 which in turn are connected to a source of water under pressure, such as the water system of a house or other dwelling. Flushing water can be sent to the housing via manual actuation of a valve 46 or by automatic actuation of a solenoid or other valve 48 when the animal departs the disposal system of this invention.

As indicated above, the disposal system of this invention may be provided with control means 50 which operate to control the sequence of events once an animal has entered the housing 12. The floor 14 may be provided with pressure sensitive sensors 52 which in turn send a signal to the control means and indicate that the animal has entered the housing. Preferably a plurality of sensors will be spread across the area of the floor, at least in the vicinity of the entranceway 22 so that if the animal enters anywhere across the entranceway its presence will be detected. The control means also includes circuitry which will create a second signal once the animal leaves the housing after having relieved itself. After a predetermined interval the control means will activate the flushing valve 46 so that a spray of water will be sent towards the floor 14 to push solid waste in the direction of the collection trough 30. The flushing water will also cause any liquid waste that is in the floor grooves 28 or on the surface of the floor to flow downwardly to the collection trough 30. After another predetermined period of time, counted in seconds, the control means 50 will cause the pump 38 to start so as to draw waste from the collection trough 30 into the drain pipe 34 and then send it into the disposal pipe 40. As the solid waste passes through the pump it is macerated to improve the ease of flow to the sewer.

The pump and the flushing valve need not be controlled by the control means 50. They could be provided with simple "on/off" switches 54 that the pet owner could operate to activate the flushing unit and to then activate the pump. With the automatic system the flushing unit would operate for a set period of time, say 25 seconds, and the pump would also operate for a set period of time, say 20 seconds. Those periods of time should be sufficient for the waste material to be flushed from the floor 14 and floor grooves 28 to the collection trough 30 and for the waste material to flow into the drain pipe and to be pumped to the sewer. Preferably the flushing unit will operate slightly longer than the pump to ensure that all waste material has been removed from the housing 12 and to also provide for a brief wash of the floor, the grooves therein, and the collection trough. With manual operation the pet owner can control the operation of the flushing unit and the pump, allowing each to run as long as necessary to clear all waste material from the housing. In the preferred embodiment of the invention the switches 54 would act as override switches for manual control of the flushing unit and the pump in the event of a heavy accumulation of waste that could not be removed within the time periods available under automatic operation.

The floor 14 and the floor grooves 28 are preferably molded from a suitable plastics material. Such material should have a low coefficient of friction so that liquid and solid waste will not stick thereto and so that such waste will be easily moved under water pressure as provided by the flushing system. On the other hand the material should not be so slippery that an animal will slip once it stands on the floor. A slippery floor would make the animal nervous and it might then be reluctant to use the facility on a regular basis. The disposal system of the present invention should be attractive to an animal and it should be presented to the animal during training as a place that it can be comfortable in while relieving itself. The housing may be formed as an integral unit or it may be constructed from a plurality of separately formed components which could be assembled by the purchaser.

The preferred form of the housing 12 is as shown in the drawings herein, namely of a generally rectangular shape. It could be circular or of any other shape as long as it has the sloping grooved floor, the collection trough, and the pump unit generally as described herein. It could also have a roof or cover (not shown) to increase the feeling of privacy for the animal. Furthermore, it could have a removable upstanding piddle post 56 (FIG. 1) for the convenience of canine pets. It could also be adapted for fitment on a standard domestic toilet should the pet owner wish to train his or her pet to use the home's bathroom as its own waste disposal facility. In this case it would be a simple matter for the owner to connect the flushing unit to the water supply for the domestic toilet such that the flushing unit of the disposal system could operate whenever the domestic toilet is flushed. It would also be possible to connect the disposal pipe 40 to the toilet outlet as a ready connection to the sewer system. Needless to say, a skilled practitioner could modify the basic invention to suit his or her own needs without departing from the essential aspects of the present invention and hence the protection to be afforded this invention is to be determined from the scope of the claims appended hereto.

What is claimed is:

1. A system for the collection and disposal of animal waste comprising:
    a housing defining upstanding walls and a floor, said floor sloping rearwardly from a forward edge thereof towards a rear edge thereof, said walls defining an entranceway to said housing at the forward edge of said floor;
    a plurality of generally parallel grooves in the upper surface of said floor, said grooves extending from adjacent said forward edge towards said rear edge of said floor;
    a collection trough extending transversely of said floor at said rear edge, said collection trough including a drain opening in a lower surface thereof, the lower surface of said collection trough sloping downwardly towards said drain opening;
    a drain pipe connected to said drain opening leading away therefrom; and
    a pump connected to said drain pipe and also connected to a sewer inlet, said pump adapted to pump waste from said drain pipe to said sewer;
    whereby liquid animal waste deposited on said floor will flow downwardly along said grooves to said collection trough and solid animal waste will flow downwardly along said floor to said collection trough, from which said liquid and solid waste is pumped by said pump along said drain pipe to said sewer.

2. The system of claim 1 wherein said grooves slope downwardly from adjacent said forward edge of said floor at an angle greater than the angle at which said floor slopes downwardly from its forward edge to its rear edge.

3. The system of claim 1 including flushing means connected to said housing for introducing flushing water thereto for aiding the flow of liquid and solid waste to said collection trough and for cleaning said housing of any leftover waste.

4. The system of claim 3 including means for detecting the presence of an animal within said housing and for operating said flushing means after said animal has exited said housing.

5. The system of claim 4 including means connected between said flushing means and said pump for operating said pump in conjunction with the operation of said flushing means.

6. The system of claim 3 including manual switch means for independently manually controlling said flushing means and said pump.

7. The system of claim 3 wherein said flushing means includes a plurality of nozzles located in said forward edge, directed towards said floor, and additional nozzles in said side walls, directed towards said collection trough.

8. The system of claim 1 wherein said pump is provided with macerating means for macerating solid waste passing therethrough and to thereby aid the flow of such waste to the sewer.

9. The system of claim 1 wherein said walls and said floor are formed from a plastics material that will not be adversely affected by animal waste.

10. The system of claim 1 wherein said grooves extend from adjacent the forward edge of said floor and exit into said collection trough.

11. The system of claim 1 wherein said pump is connected to said sewer inlet by a disposal pipe.

12. The system of claim 1 including a piddle post extending upwardly from said floor for use by dogs.

13. The system of claim 1 wherein said drain opening is located centrally of said collection trough.

14. A system for the collection and disposal of animal waste comprising:
    a housing defining upstanding walls and a floor, said floor sloping rearwardly from a forward edge thereof towards a rear edge thereof, said walls defining an entranceway to said housing at the forward edge of said floor;
    a plurality of generally parallel grooves in the upper surface of said floor, said grooves sloping downwardly from adjacent said forward edge towards said rear edge of said floor at an angle greater than the angle at which said floor slopes downwardly from its forward edge to its rear edge;
    a collection trough extending transversely of said floor at said rear edge, said collection trough including a drain opening in a lower surface thereof, the lower surface of said collection trough sloping downwardly towards said drain opening;
    a drain pipe connected to said drain opening leading away therefrom; and
    a pump connected to said drain pipe and also connected to a sewer inlet, said pump adapted to pump waste from said drain pipe to said sewer;
    whereby liquid animal waste deposited on said floor will flow downwardly along said grooves to said collection trough and solid animal waste will flow downwardly along said floor to said collection trough, from which said liquid and solid waste is pumped by said pump along said drain pipe to said sewer.

\* \* \* \* \*